June 2, 1942.  H. J. KUHLMAN  2,284,909
CORN HARVESTER
Filed Aug. 3, 1940   3 Sheets-Sheet 1

INVENTOR.
Henry J. Kuhlman,
BY Bair & Freeman
ATTORNEYS.

June 2, 1942.  H. J. KUHLMAN  2,284,909
CORN HARVESTER
Filed Aug. 3, 1940  3 Sheets-Sheet 2
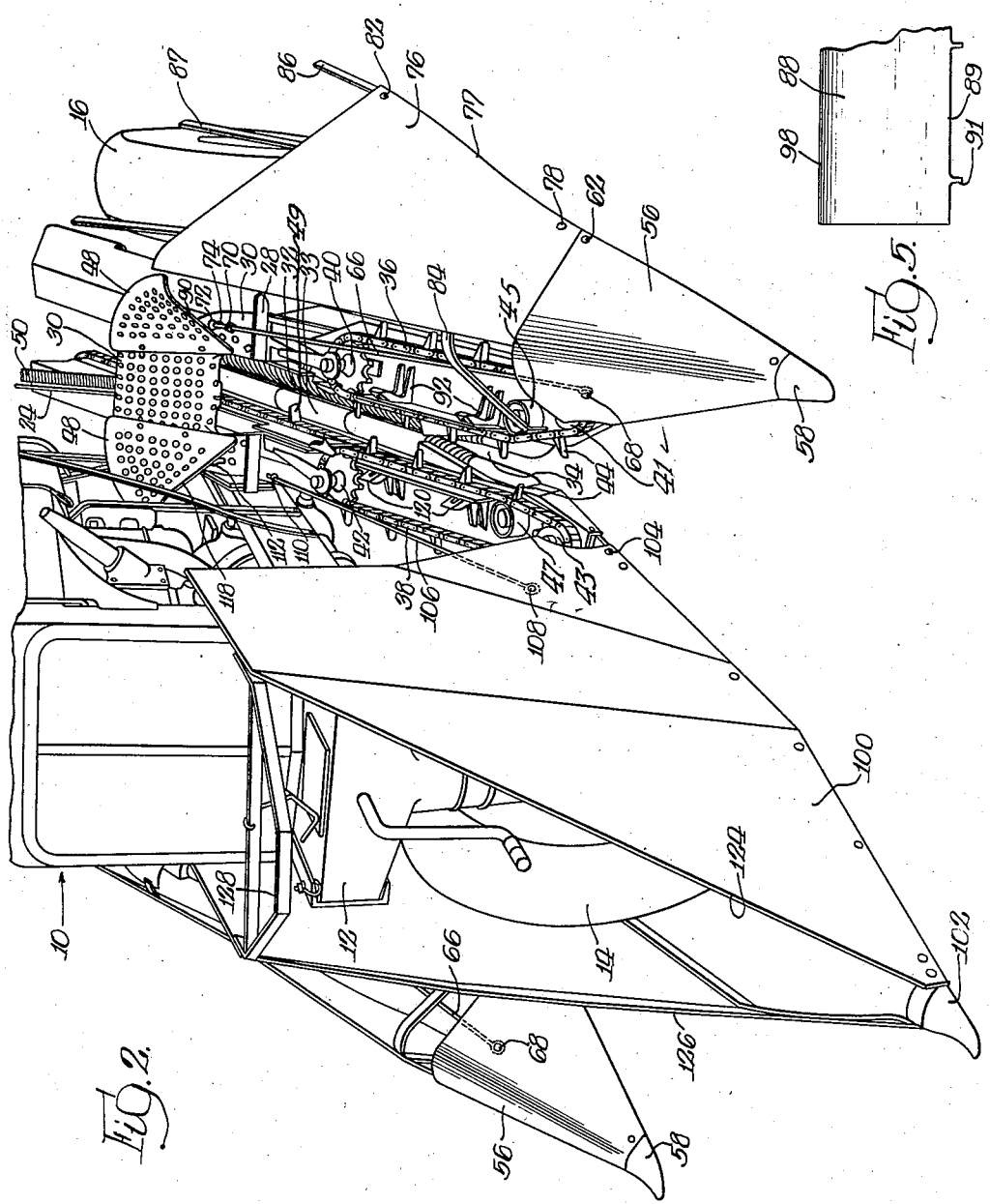
INVENTOR.
Henry J. Kuhlman,
BY Bair & Freeman
ATTORNEYS.

June 2, 1942.  H. J. KUHLMAN  2,284,909
CORN HARVESTER
Filed Aug. 3, 1940   3 Sheets-Sheet 3
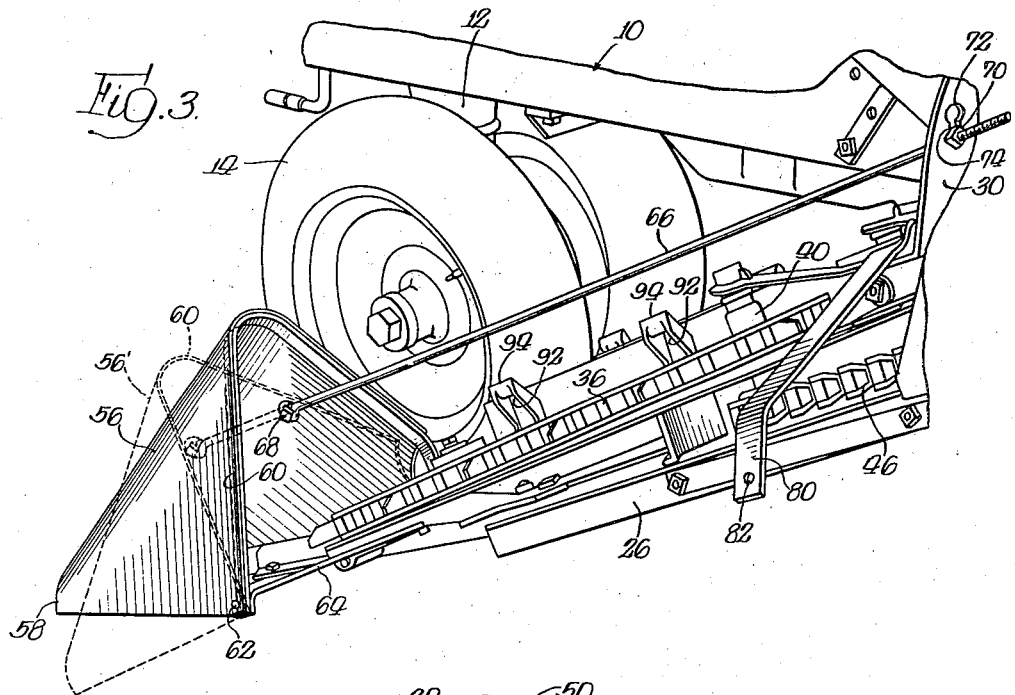
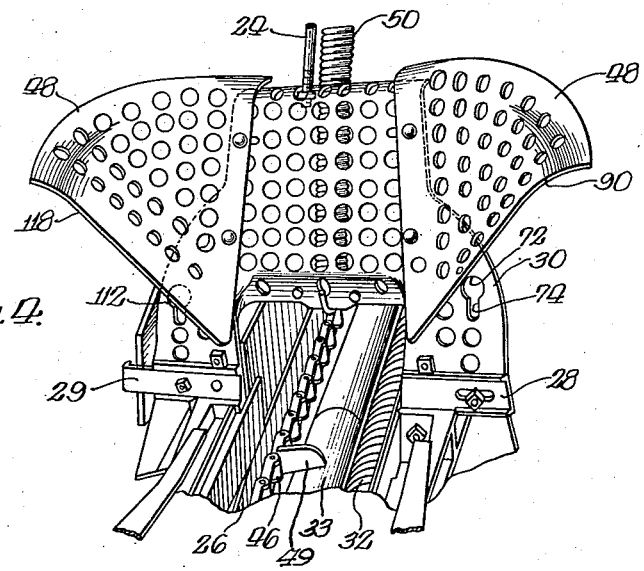
INVENTOR.
Henry J. Kuhlman,
BY Bair + Freeman
ATTORNEYS.

Patented June 2, 1942

2,284,909

UNITED STATES PATENT OFFICE 2,284,909

CORN HARVESTER

Henry J. Kuhlman, Waterloo, Iowa, assignor to Kuhlman Manufacturing Company, Waterloo, Iowa, a corporation of Iowa Application August 3, 1940, Serial No. 350,317

8 Claims. (Cl. 56—18)

My invention relates to corn harvesters or pickers and particularly corn harvesters of a type customarily designed for mounting upon a tractor.

Among the objects of my invention is to provide a corn harvester or picker equipped with protective guards for moving parts of the harvester such as the gathering chains designed so that portions of them are adapted to be quickly and easily removed in order to give access to the moving parts when in need of mechanical adjustment from time to time.

Another object of my invention is to provide a corn harvester having gathering chain guards including portions adjacent the working parts of the machine which are securely held in place during normal operation but which can be released and removed by manipulation of a single locking device.

Still another object of my invention is to provide a system of gathering chain guards for a corn harvester which are so positioned and proportioned that they extend well outwardly from the working parts of the machine at distances sufficiently great so that while the machine is in operation the moving parts are beyond reach of an attendant who may be thereby prevented from attempting to handle or adjust the moving parts until the machine has been stopped.

As a further safety object, removable portions of the gathering chain guards are made so that they can be conveniently removed only when the machine has been stopped so that an attendant will be discouraged from attempting to gain access to the working parts while they are in motion.

Still another object of my invention is to provide a compact corn picker for mounting upon a tractor wherein the main portion of the picker device is suspended by means of an arch serving both as a support for the machine and a guard coacting with the gathering chain guards to prevent corn stalks from being tossed inadvertently into the moving parts of the machine, the arch being further made of such a size and so positioned that it prevents ready access to the moving parts of the machine when the machine is in motion.

With these and other objects in view, my invention consists in the construction, arrangement and combination of the various parts of my device whereby the objects contemplated are attained, as hereinafter more fully set forth, pointed out in my claims and illustrated in the accompanying drawings, in which:

Figure 2 is a front perspective view of the corn picker on a tractor drawn to a slightly larger scale, showing parts of the gathering chain guard removed.

Figure 3 is an enlarged detail view of a forward portion of the outer gathering chain guard and mountings for the guard.

Figure 4 is a detailed view of the supporting arch which cooperates with the guards.

Figure 5 shows a partial view in elevation of one of the gathering chain guards.

Figure 1:
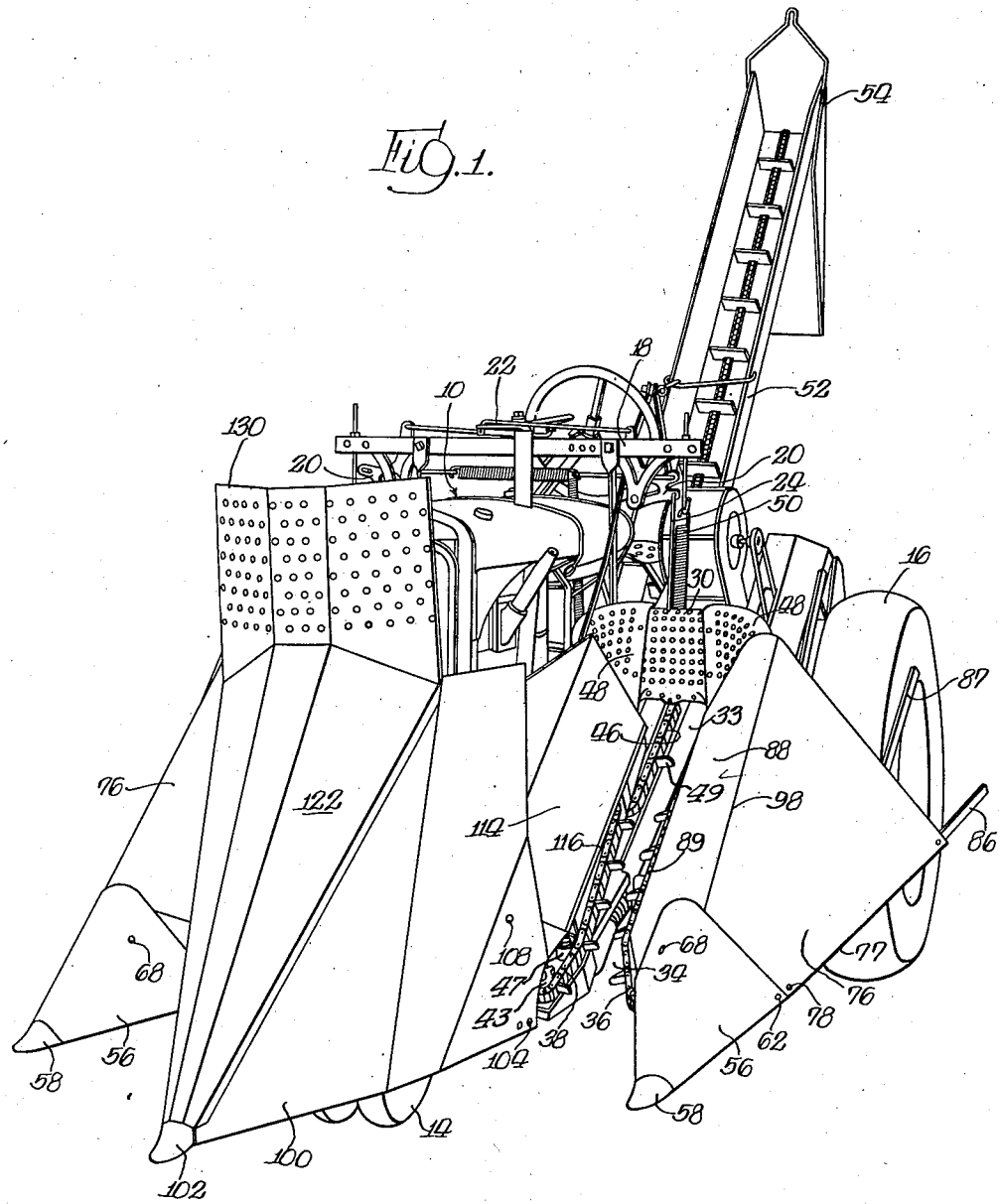
Figure 1 is a front perspective view of the corn picker mounted on a tractor.

In producing agricultural machines for use by farmers and persons not familiar with the structural make-up of complicated machines it is the constant aim to design machines of an extremely simple character having a minimum of movable parts so that whatever adjustments may actually be necessary can be quickly and conveniently made in the field.

Frequently, too, when these machines are being use it is necessary that they continue with as little interruption as possible so that there may be no likelihood of loss of harvesting time and consequent loss of crops where conditions might be adverse.

In making adjustments in the field the farmer is always handicapped by having relatively few tools so that every device built into a machine which makes adjustments easier, quicker and safer is highly beneficial.

Also, in the field when farmers are engrossed in the duties required of them in harvesting a crop they are prone to be careless and hasty when mechanical adjustments need to be made to the harvesting machine. Frequently in their haste they will attempt to make adjustments while machines are dangerously in motion and serious injuries frequently result when arms or clothing are caught in the moving parts.

This invention is therefore devoted to the double purpose of providing easy access to parts of the machine which need occasional attention but at the same time making access to those parts only available when the corn picker has ceased its operation.

In the drawings, there is shown a commercial tractor 10 known commonly as the tricycle type, which is provided with a narrow front carriage 12 for front wheels 14 spaced close together and with rear wheels 16 spaced relatively far apart. A bracket 18 is secured to the body of the tractor by means of vertical supports 19. The bracket is bolted to the tops of the supports and runs crosswise across the top of the tractor. Upon this bracket are pivoted bell crank levers 20 one on each side, one end of which is connected to an elevating lever device 22 and the other end of which supports a rod 24.

The corn picker is supported by a pair of complementary frames 26 one on each side of the machine. These frames in turn are provided with straps 28 and 29 as best seen in Figure 4, and to the straps are bolted opposite ends of an arch member 30. The arch member in turn is secured to the rod 24 so that the frame at each side of the machine is suspended intermediate its forward and rearward ends by means of the rod 24 and the bracket 18.

The purpose of the frame is to support and position corn picking machinery at the side of the tractor. This machinery consists in the main of a pair of rollers 32 and 33 equipped with suitable gearing so that they are driven one against the other in a manner similar to the rollers of a clothes wringer. At the forward ends of the rollers there is a gap 34 into which corn stalks are directed in order to be operated upon by the rollers. For the purpose of bringing corn stalks into contact with the rollers there is provided what are known as gathering chains for each set of rollers, the chains on the right side of the frame as viewed in Figure 2 being indicated by the characters 36 and 38. These chains are actuated by suitable sprockets 40 and 42 respectively and are directed around appropriate idling sprockets 41 and 43 and rollers 45 and 47. On each chain is a series of teeth 44 which engage the stalks of corn as the machine travels along a row of corn for directing the standing stalks into the gap 34 and thence into contact with the rollers. In turn, the rollers snap ears of corn from the stalks and tear the husks from the ears as the ears are passed upward along the rolls guided by a conveyer chain 46 shown in Figures 2 and 4. It will be noted that there is a conveyor chain 46 shown near the roller 32 and a similar chain 46 on the other side near the roller 33 but not shown on the drawings. The chains are mounted for movement in planes parallel to and immediately above the roller in each case. The chains also are provided with teeth 49 extending over the rollers to engage the severed ears of corn and move them upward along the valley formed between the rollers.

At each side of the arch 30 is bolted a baffle or wing 48 curved toward the front which together with the central portion of the arch form a guard or baffle in order to prevent the corn stalks from being knocked into the mechanism of the machine above the lower ends of the rolls. A spring 50 is provided for cushioning the arch supported framework in an operative position.

Ears of corn which have been stripped from the stalks and husked by operation of the rollers are passed upward along the rolls by the conveyer chain 46 to the top from which they are conducted by appropriate chutes to a hopper, not shown, from which an elevating rack 52 lifts them to a height 54 where they can be dumped into a wagon drawn behind the tractor.

In order to properly protect and guard the rollers and gathering chains a system of gathering chain guards comprising several sections of a material such as sheet metal is built around the parts so that it forms substantially a complete housing for them. Gathering chain guards for the outside of the corn picker are similar on both sides and it is therefore deemed that a description of one will suffice for the other.

At the forward end of the outside of the frame is a toe piece 56 which extends to a point 58 at the forward end. From the point the toe piece spreads upward and outward toward the rear so that a rear edge 60 has the general shape of a triangle in cross section, as best seen in Figure 3.

The toe piece is pivoted at 62 to a bracket 64 fastened to the frame. As thus pivoted, the toe piece can move between a normal position shown by the full lines of Figure 1, to a released position, shown by the dotted lines 56' in the same figure. For positioning the toe piece a shaft 66 is pivotally secured at its front end at the point 68 to the upper portion of the toe piece and extends obliquely upward and to the rear more or less in line with the gathering chains. At its rear end the rod is provided with a nut 70 which can be adjusted along the rod throughout a desired interval and for convenience in operation a substantial portion of the rod is permitted to extend rearward behind the nut. To secure the rod there is provided in the arch 30 a circular aperture 72 having a diameter larger than the maximum diameter of the nut and at the lower side of the aperture is a slot 74 having a width slightly greater than the diameter of the shaft. When the rod is to be secured it is passed into the aperture 72 until the nut passes through the aperture and then lowered into the slot 64 so that the nut will be caught at the rear edges of the slot and thus hold the rod in position.

At the outside of the frame there is provided an outside guard 76, the lower edge 77 of which is permanently secured to the bracket 64 at the point 78 and to a rear bracket 80 at the point 82. The outside guard lies upon a triangular shaped bracket 84 at the front end in order to support it in position. Fenders 86 and 87 are provided at the rear for fending stalks of corn away from the rear wheels of the tractor.

There is likewise provided an inside gathering chain guard 88 which immediately overlies the gathering chains. This consists of a removable piece of sheet metal which completes the closure of the mechanism on the outside of the rollers. The inside guard is provided at its lower edge 89 with projecting tongues 91 shown in detail in Figure 5, which are designed to be inserted into apertures 92 in the angle brackets 94 located upon the frame immediately adjacent the gathering chains. When the inside guard is to be secured in place, the projections 91 are inserted into the apertures 92 and the guard laid over the triangular bracket 84 at the front end and over a forward edge 90 of the adjacent curved baffle 48 in order to give it support. The inside guard has a curved top edge 98 designed so that it will overlie the top edge or ridge of the outside bracket.

When the inside guard is being thus put into place the toe piece is maintained in a downwardly tilted position as shown by the dotted lines of Figure 3. Once the inside guard has been put into position the toe 56 is tilted backward by drawing up on the shaft 66 and placing the nut 70 behind the slot 74. This action draws the rear edge of the toe piece to a position overlapping the front end of the inside guard and secures it in place. When it is desired to remove the inside guard the shaft 66 is released permitting the toe piece to tilt forward and the inside guard can then be readily withdrawn without any further unlocking being necessary. Should the toe piece not be snug against the outside and inside guards when first drawn to a locked position the nut 70 can be tightened until the proper adjustment is secured. After this is done no further adjustment of the nut is necessary to release the shaft and toe piece since it can be lifted slightly and slipped through the aperture 72.

A central forward guard 100 for the front truck of the machine is shown located centrally immediately ahead of the tractor and this guard likewise extends to a point 102. At its rear the guard spreads rather widely to positions on opposite sides of the forward part of the tractor. The guard 100 is a complete housing in itself and is pivotally secured to the frame at points 104, one on each side, so that the central guard can be tilted up and down.

For holding the central forward guard in an upward position there is provided a shaft 106 similar to the shaft 66 on the opposite side which is pivotally secured at a point 108 to the front guard. The shaft 106 is similarly provided with an adjustable nut 110 at the top end insertable into a suitable slotted aperture 112 in the arch. Unlike the outside toe piece, the central forward guard is provided with two rods like the rod 106 one on each side of the tractor so that a double support is provided for it.

For covering and protecting gathering chains on the inner side of the frame at the right of the tractor there is provided an inside central guard piece 114 having a lower edge 116 equipped with the tongues not shown but which are similar to the tongues on the inside guard first described. This guard is mounted in a manner similar to that described for the inside guard first mentioned. The rear end of the guard is supported by an edge 118 of the inside baffle 48 and is supported at the forward edge by the body of the tractor.

In order to secure the central inside baffle in place, the central forward guard 100 is released by unlatching the shaft 106 permitting it to tilt downward. After the central inside guard has been positioned by means of the tongues fitted into appropriate angle brackets 120 the central forward guard is then tilted backwards to a normal position and there secured by locking the nut 110 behind the slotted aperture 112.

At the middle of the central forward guard there is provided a hood 122 which overlies the edges 124 and 126 and is supported at the top edge by an arched bracket 128. The hood is likewise provided with a vertical baffle 130 for protecting the front end of the tractor. This hood can be slipped into place after the other guards have been properly assembled but is designed to be removed at any time in order to give access to the front end of the tractor so that if necessary it can be cranked.

It will be noted that the lower edge 77 of the outside guard 76 is projected outwardly from the side of the machine a considerable distance and it will be noted that this lower edge is at approximately ankle-height above the ground. The upper edge of the guard where it is overlapped by the curved edge 98 of the inside guard is elevated to an average distance above ground approximately waist-high. This combination of dimensions makes it practically impossible for an attendant walking at the side of the machine to reach over the ridge of the combined outside and inside guards far enough to get his arm or hand caught in the rollers should he attempt to make an adjustment or pull out clogging masses of stalks.

Moreover, the point 58 of the toe piece 50 is extended sufficiently far in front of the gathering chains so that an attendant likewise near the front of the gathering chain guards is prohibited from reaching into the space between the rollers. Therefore, should the machine become clogged with stalks, it becomes necessary to stop operation of the machine to permit an attendant to step into the breach between the outside and central guards in order to clear the stalks from the space between the rollers.

Moreover, the guards are so designed so that the toe piece 56, and likewise the central forward guard 100, cannot be lowered while the tractor is in motion in order, for example, to remove the inside guard 88. Should removal be attempted the point 58 of the toe piece would dig into the ground and cause the machine to be halted. It is a further insurance against an attendant inadvertently making any adjustment of the moving parts of the machine while the machine is moving forwardly through a field of corn.

There has thus been provided a corn picker equipped with easily adjusted safety guards which together form a substantially complete housing over the working parts of the machine and which can be readily removed under certain relatively safe circumstances in order to permit necessary adjustments in the field.

Some changes may be made in the construction and arrangement of the parts of my device without departing from the real spirit and purpose of my invention, and it is my intention to cover by my claims any modified forms of structure, or use of mechanical equivalents, which may be reasonably included within their scope.

I claim as my invention:

1. In a corn harvester adapted to be mounted upon a tractor including a frame for supporting coacting picking and husking rolls and gathering chains extending along said rolls, the combination of a gathering chain guard unit comprising a forwardly extending toe piece having a point in front and spreading toward the rear to an enlarged cross sectional shape, said toe piece being pivotally secured at the rear to the frame, a side guard having an upper ridge extending rearwardly from the top of the toe piece, said guard projecting laterally and downwardly to a lower edge adjacent the gathering chains, coacting temporary engaging elements on said lower edge and on the frame respectively for temporarily holding said lower edge in place, means for positioning the toe piece including a bracket on the frame and interlocking elements on said bracket and said toe piece respectively adapted when engaged to hold the toe piece normally in an upwardly tilted position overlapping and securing the side guard and when disengaged to release the toe piece to permit removal of the side guard.

2. In a two row corn harvester adapted to be mounted upon a tractor including a frame for supporting coacting picking and husking rolls and gathering chains extending along said rolls, the combination of a pair of gathering chain guard units comprising each a forwardly extending toe piece having a point in front and spreading toward the rear to a form substantially triangular in cross section, said toe piece being pivotally secured at the lower rear sides to the frame, a side guard having an upper ridge extending rearwardly from the top of the toe piece, said guard projecting laterally and downwardly to a lower edge adjacent the gathering chains, coacting temporary engaging elements on said lower edge and on the frame respectively for retaining said lower edge in place, a shaft having an adjustable head at one end and pivoted at the other end to the toe piece and a bracket having a slotted aperture adapted to receive and retain the slotted head of the shaft for holding the toe piece normally in an upwardly tilted position overlapping and securing the side guard, said shaft being adapted to be released for releasing the toe piece to permit removal of the side guard.

3. In a corn harvester adapted to be mounted upon a tractor including a frame for supporting coacting picker and husker rolls and gathering chains extending along the rolls adapted to draw corn stalks to a position between said rolls, the combination of a gathering chain guard unit on one side of the rolls comprising an outside guard permanently secured to the frame projecting outwardly and downwardly from an upper longitudinal ridge to a level adjacent the ground, a forward toe piece having a point in front and spreading toward the rear to a substantially larger cross sectional shape, said toe piece being pivotally secured at the lower rear side thereof to the frame so that the rearward edge overlaps the outside guard in normal position, an inside guard having an upper edge adjacent the ridge of said outside guard and projecting downwardly and inwardly to a lower edge adjacent the gathering chains, said lower edge and the frame having coacting engaging means for releasably holding the lower edge in place, and a shaft pivotally secured at one end to the toe piece extending rearwardly beneath said inside guard, a bracket on the frame and interlocking elements on said bracket and said shaft respectively adapted to anchor the shaft in normal position so that the toe piece overlaps and anchors the inside guard in place.

4. In a corn harvester adapted to be mounted upon a tractor including a frame for supporting coacting picker and husker rolls and gathering chains extending along the rolls adapted to draw corn stalks to a position between said rolls, the combination of a gathering chain guard unit on one side of the rolls comprising an outside guard permanently secured to the frame projecting outwardly and downwardly from an upper longitudinal ridge to a level adjacent the ground, a forward toe piece having a point in front and spreading toward the rear to a form substantially triangular in cross section, said toe piece being pivotally secured at the lower rear side thereof to the frame so that the rear edge overlaps the side guard in normal position, an inside guard having an upper edge overlapping the ridge of said outside guard and projecting downwardly and inwardly to a lower edge adjacent the gathering chains, said lower edge and the frame having coacting engaging means for releasably holding the lower edge of said inside guard in place, and a shaft having an adjustable head at one end and pivotally secured at the other end to the upper portion of the toe piece positioned substantially beneath said inside guard, a bracket on the frame having a slotted aperture to receive and anchor the shaft head in normal position so that the toe piece overlaps said inside and outside guards and anchors said inside guard in place, said shaft head being releasable therefrom to permit release of the pivoted toe piece and simultaneously to release said inside guard.

5. In a corn harvester adapted to be mounted upon a tractor including a frame for supporting picking and husking rollers and gathering chains therefor, the combination of gathering chain guards surrounding and covering the parts of said corn harvester comprising a side guard including a pointed toe piece movably secured to the frame including an anchoring member normally connected between said toe piece and the frame having a released position permitting movement of the toe piece between operative and inoperative positions, said toe piece having the point thereof extending in advance of the gathering chains a distance greater than arm's length of an attendant, an outside guard having lower edge adjacent the ground at a substantially ankle elevation and an upper edge sloping inwardly and upwardly a distance greater than arm's length of an attendant at the side of said harvester, and a removable inside guard retained in position by said toe piece and adapted to be removed only when the toe piece is released.

6. In a corn harvester adapted to be mounted upon a tractor including a frame for supporting picking and husking rollers and gathering chains therefor, the combination of gathering chain guards surrounding and covering the parts of said corn harvester comprising a central forward guard surrounding the forward part of the tractor and extending in advance of the forward tractor wheels, and a side guard including a pointed toe piece movably secured to the frame including an anchoring member normally connected between the toe piece and the frame having a released position permitting movement of the toe piece in a direction toward and away from the ground, said toe piece having the point thereof extending in advance of the gathering chains, an outside guard having lower edge adjacent the ground at a substantially ankle elevation and an upper edge sloping inwardly and upwardly a distance greater than arm's length of an attendant at the side of said harvester, and a removable inside guard retained in position by said toe piece when in normal position and adapted to be removed only when the toe piece is released from normal position with the pointed toe thereof in inoperative position against the ground.

7. A corn harvester adapted to be mounted upon the side of a tractor comprising a bracket extending laterally from the tractor, a frame suspended from the bracket in a forwardly sloping position at the side of the tractor for supporting picking and husking rolls for corn and gathering chains therefor, an arch member secured to the frame with one end at each side of the rollers for linking the frame to the bracket and having a wide vertical central portion above the rolls for simultaneously serving as a guard to fend off stalks of corn from the rearward working parts of the harvester, inside gathering chain guards extending from the sides of the arch forwardly over said gathering chains to a point in advance of the frame and outside guards extending from said point rearwardly to a point substantially in line with said arch.

8. A corn harvester adapted to be mounted upon the side of a tractor comprising a bracket extending laterally from the tractor, a frame suspended from the bracket in a forwardly sloping position at the side of the tractor for supporting picking and husking rolls for corn and gathering chains therefor, an inverted substantially U-shaped arch member having a wide vertical central portion secured at the ends on opposite sides of the rollers for linking the frame to the bracket, wings on the legs of the U-shaped arch serving together with the central portion thereof as a guard to fend off stalks of corn from the rearward working parts of the harvester, said wings having forwardly projecting edges and inside gathering chain guards supported by the edges of the arch and extending forwardly over said gathering chain guards supported by the edges of the arch and extending forwardly over said gathering chains to a point in advance of the frame and outside guards extending from said point rearwardly to a point substantially in line with said arch.

HENRY J. KUHLMAN.